United States Patent
Woodruff (10) Patent No.: US 7,433,952 B1
(45) Date of Patent: Oct. 7, 2008

(54) SYSTEM AND METHOD FOR INTERCONNECTING A STORAGE AREA NETWORK

(75) Inventor: Roger Woodruff, Plymouth, MN (US)

(73) Assignee: Cisco Technology, Inc., San Jose, CA (US)

( * ) Notice: Subject to any disclaimer, the term of this patent is extended or adjusted under 35 U.S.C. 154(b) by 636 days.

(21) Appl. No.: 10/404,377

(22) Filed: Mar. 31, 2003

Related U.S. Application Data (60) Provisional application No. 60/374,921, filed on Apr. 22, 2002.

(51) Int. Cl.
*G06F 15/173* (2006.01)

(52) U.S. Cl. ...................................... 709/226

(58) Field of Classification Search ................. 709/224, 709/226, 245, 250
See application file for complete search history.

(56) References Cited

U.S. PATENT DOCUMENTS

| | | | |
|---|---|---|---|
| 4,495,617 A | 1/1985 | Ampulski et al. |
| 5,390,326 A | 2/1995 | Shah |
| 5,461,608 A | 10/1995 | Yoshiyama |
| 5,473,599 A | 12/1995 | Li et al. |
| 5,535,395 A | 7/1996 | Tipley et al. |
| 5,544,077 A | 8/1996 | Hershey |
| 5,579,491 A | 11/1996 | Jeffries et al. |
| 5,581,724 A * | 12/1996 | Belsan et al. ............... 711/114 |
| 5,600,828 A | 2/1997 | Johnson et al. |
| 5,666,486 A | 9/1997 | Alfieri et al. |
| 5,732,206 A | 3/1998 | Mendel |
| 5,812,821 A | 9/1998 | Sugi et al. |
| 5,870,571 A | 2/1999 | Duburcq et al. |
| 5,909,544 A | 6/1999 | Anderson et al. |
| 5,941,972 A | 8/1999 | Hoese et al. |
| 5,951,683 A | 9/1999 | Yuuki et al. |
| 5,991,813 A | 11/1999 | Zarrow |
| 5,996,024 A | 11/1999 | Blumenau |
| 5,996,027 A | 11/1999 | Volk et al. |
| 6,006,259 A | 12/1999 | Adelman et al. |
| 6,009,476 A | 12/1999 | Flory et al. |
| 6,018,765 A | 1/2000 | Durana et al. |
| 6,041,381 A | 3/2000 | Hoese |
| 6,078,957 A | 6/2000 | Adelman et al. |
| 6,108,300 A | 8/2000 | Coile et al. |

(Continued)

OTHER PUBLICATIONS

*VMware ESX Server: User's Manual*, Version 1.0, obtained from http://web.archive.org/web/20010608201203/www.vmware.com/support,(Jun. 6, 2001),122-124.

(Continued)

*Primary Examiner*—Jason Cardone
*Assistant Examiner*—Minh-Chau Nguyen
(74) *Attorney, Agent, or Firm*—Schwegman, Lundberg & Woessner, P.A.

(57) ABSTRACT

Systems and methods for interconnecting a SAN with hosts on a remote network are disclosed. The systems and methods receive a set of device identifiers for a set of physical storage devices on the SAN. The device identifiers are mapped to a set of virtual device identifiers. Virtual devices having the virtual device identifiers are created on the remote network. The virtual devices correspond with the physical devices. Commands and responses are mapped and communicated between the virtual devices and the corresponding physical devices.

19 Claims, 3 Drawing Sheets

U.S. PATENT DOCUMENTS

| | | | |
|---|---|---|---|
| 6,108,699 A | 8/2000 | Moiin | |
| 6,131,119 A | 10/2000 | Fukui | |
| 6,134,673 A | 10/2000 | Chrabaszcz | |
| 6,145,019 A | 11/2000 | Firooz et al. | |
| 6,163,855 A | 12/2000 | Shrivastava et al. | |
| 6,178,445 B1 | 1/2001 | Dawkins et al. | |
| 6,185,620 B1 | 2/2001 | Weber et al. | |
| 6,195,687 B1 | 2/2001 | Greaves et al. | |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 | 11/2001 | Arendt et al. | |
| 6,343,320 B1 | 1/2002 | Fairchild et al. | |
| 6,363,416 B1 | 3/2002 | Naeimi et al. | |
| 6,378,025 B1 | 4/2002 | Getty | |
| 6,393,583 B1 | 5/2002 | Meth et al. | |
| 6,400,730 B1 | 6/2002 | Latif et al. | |
| 6,421,753 B1 | 7/2002 | Hoese et al. | |
| 6,425,035 B2 | 7/2002 | Hoese et al. | |
| 6,425,036 B2 | 7/2002 | Hoese et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,553,408 B1 | 4/2003 | Merrell et al. | |
| 6,574,755 B1 | 6/2003 | Seon | |
| 6,591,310 B1 | 7/2003 | Johnson | |
| 6,597,956 B1 | 7/2003 | Aziz et al. | |
| 6,606,690 B2 * | 8/2003 | Padovano | 711/148 |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,678,721 B1 | 1/2004 | Bell | |
| 6,683,883 B1 | 1/2004 | Czeiger et al. | |
| 6,691,244 B1 | 2/2004 | Kampe et al. | |
| 6,697,924 B2 | 2/2004 | Swank | |
| 6,701,449 B1 | 3/2004 | Davis et al. | |
| 6,718,361 B1 | 4/2004 | Basani et al. | |
| 6,721,907 B2 | 4/2004 | Earl | |
| 6,724,757 B1 | 4/2004 | Zadikian et al. | |
| 6,738,854 B2 | 5/2004 | Hoese et al. | |
| 6,742,034 B1 * | 5/2004 | Schubert et al. | 709/226 |
| 6,748,550 B2 | 6/2004 | McBrearty et al. | |
| 6,757,291 B1 | 6/2004 | Hu | |
| 6,760,783 B1 | 7/2004 | Berry | |
| 6,763,195 B1 | 7/2004 | Willebrand et al. | |
| 6,763,419 B2 | 7/2004 | Hoese et al. | |
| 6,771,663 B1 | 8/2004 | Jha | |
| 6,771,673 B1 | 8/2004 | Baum et al. | |
| 6,789,152 B2 | 9/2004 | Hoese et al. | |
| 6,799,316 B1 | 9/2004 | Aguilar et al. | |
| 6,807,581 B1 * | 10/2004 | Starr et al. | 709/250 |
| 6,823,418 B2 | 11/2004 | Langendorf et al. | |
| 6,839,752 B1 | 1/2005 | Miller et al. | |
| 6,845,403 B2 | 1/2005 | Chadalapaka | |
| 6,848,007 B1 * | 1/2005 | Reynolds et al. | 709/245 |
| 6,856,591 B1 | 2/2005 | Ma et al. | |
| 6,859,462 B1 | 2/2005 | Mahoney et al. | |
| 6,877,044 B2 | 4/2005 | Lo et al. | |
| 6,886,171 B2 | 4/2005 | MacLeod | |
| 6,895,461 B1 | 5/2005 | Thompson | |
| 6,920,491 B2 | 7/2005 | Kim | |
| 6,938,092 B2 | 8/2005 | Burns | |
| 6,941,396 B1 | 9/2005 | Thorpe et al. | |
| 6,944,785 B2 | 9/2005 | Gadir et al. | |
| 6,976,134 B1 | 12/2005 | Lolayekar et al. | |
| 6,985,490 B2 * | 1/2006 | Czeiger et al. | 370/401 |
| 7,043,727 B2 | 5/2006 | Bennett et al. | |
| 7,089,293 B2 | 8/2006 | Grosner et al. | |
| 7,120,837 B1 | 10/2006 | Ferris | |
| 7,165,258 B1 | 1/2007 | Kuik et al. | |
| 7,281,062 B1 | 10/2007 | Kuik et al. | |
| 2001/0020254 A1 | 9/2001 | Blumenau et al. | |
| 2002/0010750 A1 | 1/2002 | Baretzki | |
| 2002/0010812 A1 | 1/2002 | Hoese et al. | |
| 2002/0042693 A1 | 4/2002 | Kampe et al. | |
| 2002/0049845 A1 | 4/2002 | Sreenivasan et al. | |
| 2002/0052986 A1 | 5/2002 | Hoese et al. | |
| 2002/0055978 A1 | 5/2002 | Joon-Bo et al. | |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0161950 A1 | 10/2002 | Hoese et al. | |
| 2002/0176434 A1 | 11/2002 | Yu et al. | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0005068 A1 | 1/2003 | Nickel et al. | |
| 2003/0014462 A1 | 1/2003 | Bennett et al. | |
| 2003/0018813 A1 | 1/2003 | Antes et al. | |
| 2003/0018927 A1 | 1/2003 | Gadir et al. | |
| 2003/0058870 A1 | 3/2003 | Mizrachi et al. | |
| 2003/0084209 A1 | 5/2003 | Chadalapaka | |
| 2003/0093541 A1 | 5/2003 | Lolayekar et al. | |
| 2003/0093567 A1 | 5/2003 | Lolayekar et al. | |
| 2003/0097607 A1 | 5/2003 | Bessire | |
| 2003/0131157 A1 | 7/2003 | Hoese et al. | |
| 2003/0145116 A1 * | 7/2003 | Moroney et al. | 709/249 |
| 2003/0149829 A1 | 8/2003 | Basham et al. | |
| 2003/0163682 A1 | 8/2003 | Kleinsteiber et al. | |
| 2003/0172149 A1 * | 9/2003 | Edsall et al. | 709/224 |
| 2003/0182422 A1 * | 9/2003 | Bradshaw et al. | 709/225 |
| 2003/0182455 A1 | 9/2003 | Hetzler et al. | |
| 2003/0208579 A1 | 11/2003 | Brady et al. | |
| 2003/0210686 A1 | 11/2003 | Terrell et al. | |
| 2003/0233427 A1 | 12/2003 | Taguchi | |
| 2003/0236988 A1 | 12/2003 | Snead | |
| 2004/0022256 A1 | 2/2004 | Green | |
| 2004/0024778 A1 | 2/2004 | Cheo | |
| 2004/0064553 A1 | 4/2004 | Kjellberg | |
| 2004/0085893 A1 | 5/2004 | Wang et al. | |
| 2004/0117438 A1 | 6/2004 | Considine et al. | |
| 2004/0141468 A1 | 7/2004 | Christensen | |
| 2004/0148376 A1 | 7/2004 | Rangan et al. | |
| 2004/0233910 A1 | 11/2004 | Chen et al. | |
| 2005/0055418 A1 | 3/2005 | Blanc et al. | |
| 2005/0063313 A1 | 3/2005 | Nanavati et al. | |
| 2005/0268151 A1 | 12/2005 | Hunt et al. | |
| 2007/0112931 A1 | 5/2007 | Kuik et al. | |

OTHER PUBLICATIONS

"Cisco SN 5420 Storage Router Hardware Installation Guide", *Cisco Systems, Inc.*, (2001),98 pgs.

"Cisco SN 5428 Storage Router Hardware Installation Guide", http://www.cisco.com, (2003),76 pgs.

"High Availability for Cisco SN 5420 Storage Router-Based iSCSI Solutions", http://www.cisco.com, Cisco Systems, Inc.,(Jan. 2002),1-32.

"News Release: Cisco Introduces the Cisco SN 5428 Storage Router", http://newsroom.cisco.com/dlls/prod_051402b.html, (May 14, 2002),3 p.

"News Release: Cisco SN 5420 Storage Router Delivers iSCSI to Storage Networking", *Cisco Systems*, (Apr. 9, 2001),3 pgs.

Bakker, G. , *IP Aliasing*, obtained from http://www.zone-h.org/files/24/ip_aliasing.txt,(1999),3 pgs.

Gusella, R., et al., "An Election Algorithm for a Distributed Clock Synchronization Program", *Report No. UCB/CSD 86/257*, University of California, Berkeley,(Dec. 1985),1-17.

Gusella, R., et al., "The Berkeley UNIX Time Synchronization Protocol", *UNIX Programmers Manual 4.3*, vol. 2C, Berkeley Software Distrib.,,(1986), 10 pgs.

Knight, S., et al., *Virtual Router Redundancy Protocol*, Network Working Group, RFC 2338, obtained from http://www.search.ietf.org/rfc/rfc2338.txt,(1998),26 p.

Lewis, P., "A High-Availability Cluster for Linux", *Linux Journal*, 64, obtained from http://www2.linuxjournal.com/lj-issues/issue64/3247.html,(Apr. 1994), 11 p.

Li, T., et al., *Cisco Hot Standby Router Protocol (HSRP)*, Network Working Group, RFC 2281, obtained from http://www.search.ietf.org/rfc/rfc2281.txt,(1998), 16 p.

Meth, K. Z., et al., "Design of the iSCSI protocol", *Proceedings of the 20th IEEE Conference on Mass Storage Systems and Technologies*, (Apr. 7-10, 2003),116-122.

Moore, K., *On the Use of HTTP as a Substrate*, Network Working Group, RFC 3205, obrtained from http://www.search.ietf.org/rfc/rfc3205.txt,(2002), 14 p.

Satran, J., et al., *iSCSI*, IPS Internet Draft, draft-ietf-ips-iSCSI-12.txt, Category: standards—track,(Apr. 17, 2002),260 p.

Satran, J., et al., *iSCSI*, IPS Internet Draft, draft-ietf-ips-iSCSI-00, Category: Standards Track, obtained from http://www.haifa.il.ilb.com/satran/ips/draft-ietf-ips-iSCSI-00.txt,(Nov. 2000),78 p.

Simitci, H., et al., "Evaluation of SCSP over TCP/IP and SCSI over fibre channel connections", *Hot Interconnects*, 9, (Aug. 2001),87-91.

* cited by examiner

SYSTEM AND METHOD FOR INTERCONNECTING A STORAGE AREA NETWORK

RELATED FILES

This invention is related to application Ser. No. 10/128,656, filed Apr. 22, 2002, now U.S. Pat. No. 7,165,258, issued Jan. 16, 2007, entitled "SCSI-BASED STORAGE AREA NETWORK", application Ser. No. 10/131,793, filed Apr. 22, 2002, entitled "VIRTUAL SCSI BUS FOR SCSI-BASED STORAGE AREA NETWORK", provisional application Ser. No. 60/374,921, filed Apr. 22, 2002, entitled "INTERNET PROTOCOL CONNECTED STORAGE AREA NETWORK", and application Ser. No. 10/356,073, filed Jan. 31, 2003, entitled "STORAGE ROUTER WITH INTEGRATED SCSI SWITCH", all of the above of which are hereby incorporated by reference.

FIELD

The present invention relates generally to storage area networks, and more particularly to interconnecting a storage area network to a host system.

BACKGROUND

The use of Storage Area Networks (SANs) continues to grow. Generally described, a SAN is a specialized network of storage devices that are connected to each other and to a server or cluster of servers that act as an access point to the SAN. SAN's typically use special switches as a mechanism to connect the storage devices. Typically the switches are Fibre Channel based switches.

A SAN provides many advantages to users requiring large amounts of storage. First, a SAN helps to isolate storage activity from a general purpose network. For example, a SAN can be providing data to users on the general purpose network at the same time it is being backed up for archival purposes. The data traffic associated with the backup does not compete for bandwidth on the general purpose network, it typically stays on the specialized network.

An additional advantage is that a SAN can be reconfigured, i.e. storage can be added or removed, without disturbing hosts on the general purpose network.

Recently the iSCSI protocol has provided a means for computers on a TCP/IP based network to take advantage of SAN technology without the need for purchasing and installing expensive Fibre Channel interfaces and software for each host desiring access to the SAN. The iSCSI protocol has provided increased flexibility in the location of SANs with respect to the hosts that accesses the SAN, because the SAN and the host need only have a TCP/IP based network in order to communicate.

Unfortunately, this same flexibility is not available to hosts on a Fibre Channel based network. In order for a Fibre Channel based host to access a SAN, the SAN must be typically be collocated on the same network as the host, resulting in less flexibility in locating storage resources.

In view of the above, there is a need in the art for the present invention.

SUMMARY

The above-mentioned shortcomings, disadvantages and problems are addressed by the present invention, which will be understood by reading and studying the following specification.

Systems and methods interconnect a SAN with hosts on a remote network. The systems and methods receive a set of device identifiers for a set of physical storage devices on the SAN. The device identifiers are mapped to a set of virtual device identifiers. Virtual devices having the virtual device identifiers are created on the remote network. The virtual devices correspond with the physical devices. Commands and responses are mapped and communicated between the virtual devices and the corresponding physical devices.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
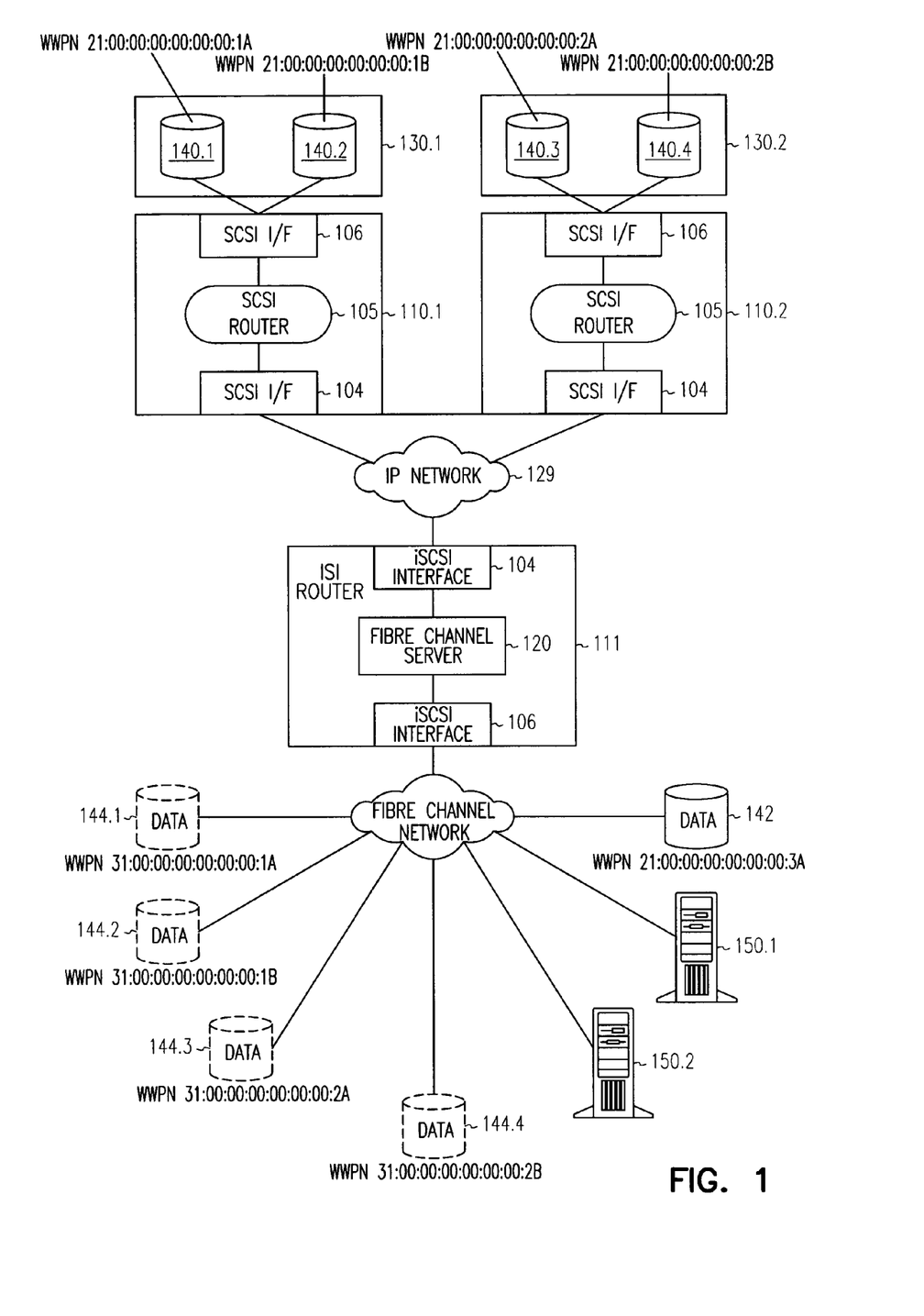
FIG. 1 is a block diagram of a hardware and operating environment in which different embodiments of the invention can be practiced.

Some embodiments of the invention operate in an environment of systems and methods that provide a means for Fibre Channel based Storage Area Networks (SANs) to be accessed from a host on a remote network. FIG. 1 is a block diagram describing the major components of such an environment. In some embodiments of the invention, a SAN interconnect environment 100 includes one or more storage routers 110 connected through storage network 130 to one or more SCSI devices 140. In the exemplary embodiment shown in FIG. 1, two storage routers 110.1 and 110.2 on two storage networks 130.1 and 130.2 are shown. However, the invention is not limited to any particular number of storage routers or storage area networks.

Each storage router 110 includes an iSCSI interface 104, one or more SCSI routers 105 and a SCSI interface 106. iSCSI interface 104 receives encapsulated SCSI packets to and from IP network 129, extracts the SCSI packet and send the SCSI packet to SCSI router 105. SCSI router 105 determines the appropriate target, and sends the SCSI packet to SCSI interface 106. SCSI interface 106 modifies the SCSI packet to conform to its network protocol (e.g., Fibre Channel, parallel SCSI, or iSCSI) and places the modified SCSI packet onto storage network 130. The SCSI packet is then delivered to its designated SCSI device 140. Conversely, SCSI data received from storage network 130 by SCSI interface 106 is sent to SCSI router 105, which then determines an appropriate destination and sends the SCSI packet to iSCSI interface 104 for encapsulation in a TCP/IP packet.

In one embodiment, storage router 110 provides IPv4 router functionality between a Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called a logical target) is an arbitrary name for a group of physical storage devices. Mappings between an iSCSI target to multiple physical devices can be established using configuration programs on storage router 110. An iSCSI target always contains at least one Logical Unit Number (LUN). Each LUN on an iSCSI target is mapped to a single LUN on a physical storage target.

Environment 100 also includes an iSCSI SAN interconnect router 111, also referred to as ISI router 111 communicably coupled to one or more storage routers 110 through IP network 129. ISI router 111 is also communicably coupled one or more Fibre Channel hosts 150 through Fibre Channel network 160. Fibre Channel network 160 may also include one or more physical storage devices 142.

ISI router 111, like storage router 110 includes an iSCSI interface 104 and SCSI interface 106. In some embodiments, SCSI interface 106 is a Fibre Channel interface connected to a Fibre Channel network 160. In some embodiments, ISI router 111 includes a Fibre Channel server 120. Fibre Channel server 120 is typically configured with the address of each storage router 110. Fibre Channel server 120 learns the SCSI devices 140 coupled through storage network 130 to each configured storage router 110, and presents these devices as if they were present on Fibre Channel network 160. Thus, Fibre Channel server 111 maintains a set of one or more virtual storage devices 144 for Fibre Channel network 160, each virtual storage device 144 corresponding to a physical SCSI device 140. Fibre Channel hosts 150 can access the virtual storage devices 144 as if they were physically present on network 160. The ISI router 111 effectively serves as a bridge between the hosts on Fibre Channel network 160 and the devices on storage area network 130, using the iSCSI protocol to communicate between the ISI router 111 and storage routers 110. Further details on the operation of the system are described below in the methods section.

Figure 2:
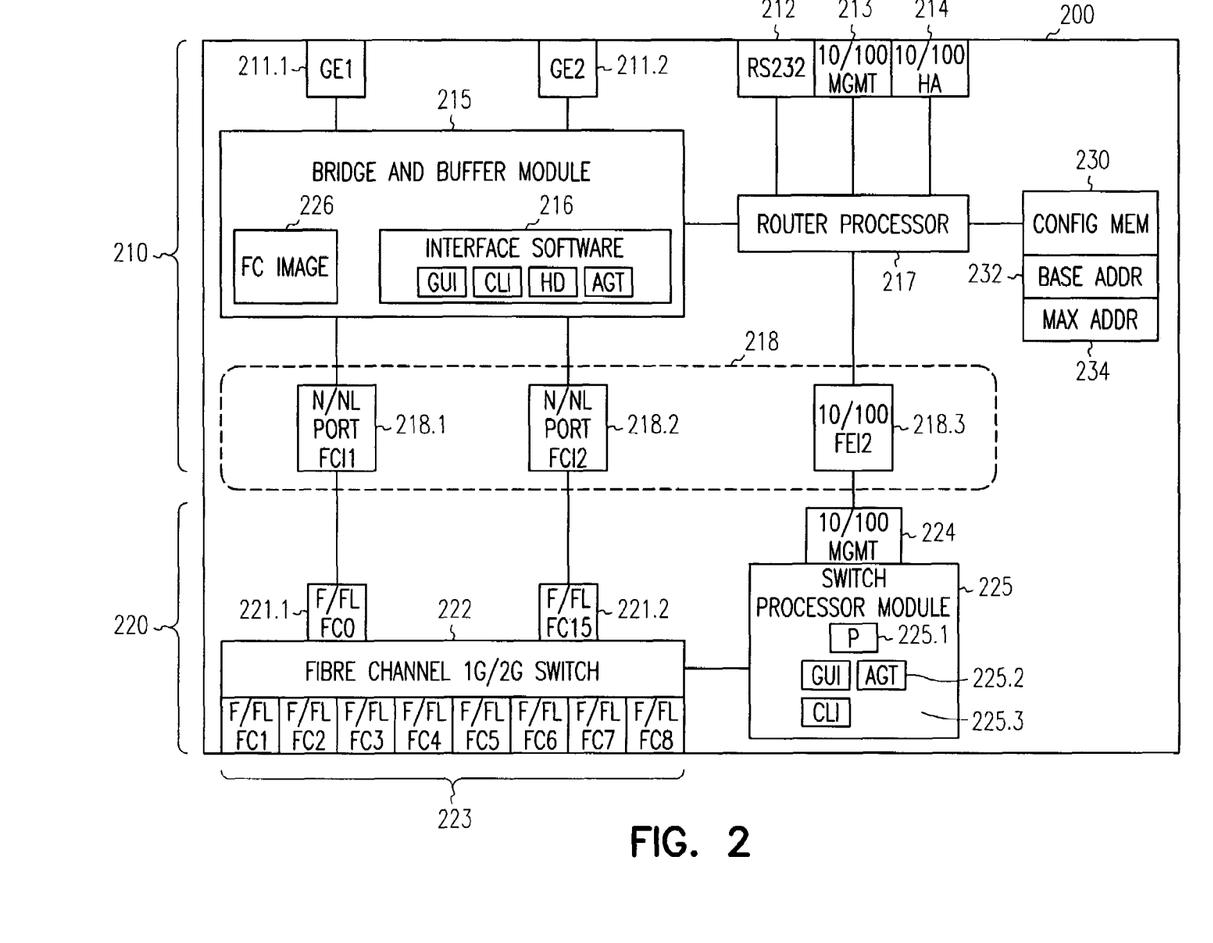
FIG. 2 is a block diagram of the major hardware components of a iSCSI Interconnect router according to an embodiment of the invention.

FIG. 2 is a block diagram providing further details of the major hardware components comprising storage router 110 and ISI router 111. In some embodiments, a storage router 110 or ISI router 111 includes a router portion 210 and a switch portion 220 on a common motherboard 200. The motherboard is powered by a power supply (not shown) and cooled by common cooling system, such as a fan (also not shown).

Router portion 210, which in the exemplary embodiment complies with draft 08 and later versions of the iSCSI protocol and incorporates commercially available router technology, such as the 5420 and 5428 Storage Routers from Cisco Systems, Inc. of San Jose, Calif., includes Gigabit Ethernet (GE) ports 211.1 and 211.2, console port 212, management port 213, high-availability (HA) port 214, bridge-and-buffer module 215, interface software 216, router processor 217, and router-to-switch interface 218.

GE ports 211.1 and 211.2 couple the storage router to an IP network for access by one or more servers or other computers, such as servers or iSCSI hosts (in FIG. 1). In some embodiments, GE ports 211.1 and 211.2 have respective MAC addresses, which are determined according to a base MAC address for the storage router plus 31 minus the respective port number. Two or more Gigabit Ethernet interfaces may be available. In some embodiments, one or more of the Gigabit Ethernet interfaces may provide internal support for maintaining Virtual Local Area Networks (VLANs). Each SCSI router typically supports a single IP address. The SCSI router IP address may be tied to any network (or VLAN) on either GE interface. Generally at least one SCSI router instance is created for each GE interface.

Console port 212 couples to a local control console (not shown). In the exemplary embodiment, this port takes the form of an RS-232 interface.

Management port 213 provides a connection for managing and/or configuring storage router 110. In the exemplary embodiment, this port takes the form of a 10/100 Ethernet port and may be assigned the base MAC address for the router-switch.

HA port 214 provides a physical connection for high-availability communication with another router-switch, such as storage router 110 in FIG. 1. In the exemplary embodiment, this port takes the form of a 10/100 Ethernet port, and is assigned the base MAC address plus 1.

Bridge-and-buffer module 215, which is coupled to GE ports 211.1 and 211.2, provides router services that are compliant with draft 08 and later versions of the iSCSI protocol. In the exemplary embodiment, module 215 incorporates a Peripheral Component Interface (PCI) bridge, such as the GT64260 from Marvell Technology Group, LTD. of Sunnyvale, Calif. Also module 215 includes a 64-megabyte flash file system, a 1-megabyte boot flash, and a 256-megabyte non-volatile FLASH memory (not shown separately.) Configuration memory 230 may be part of the flash file system, the boot flash or the non-volatile flash memory, or it may be a separate non-volatile flash memory. In addition, in alternative embodiments, configuration memory 230 may be part of a hard disk, CD-ROM, DVD-ROM or other persistent memory (not shown). The invention is not limited to any particular type of memory for configuration memory 230.

In addition to data and other software used for conventional router operations, module 215 includes router-switch interface software 216. Router-switch software 216 performs iSCSI routing between servers and the storage devices. The software includes an integrated router-switch command line interface module CLI and a web-based graphical-user-interface module (GUI) for operation, configuration and administration, maintenance, and support of the router-switch 110. Both the command-line interface and the graphical user interface are accessible from a terminal via one or both of the ports 213 and 214. Additionally, to facilitate management activities, interface software 216 includes an SNMP router-management agent AGT and an MIB router handler HD. (SNMP denotes the Simple Network Management Protocol, and MIB denotes Management Information Base (MIB)). The agent and handler cooperate with counterparts in switch portion 220 (as detailed below) to provide integrated management and control of router and switching functions in router-switch 200.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas (such as areas where log and configuration files are written).

Coupled to router processor 217 as well as to bridge-and-buffer module 215 is router-to-switch (RTS) interface 218. RTS interface 218 includes N/NL switch-interface ports 218.1 and 218.2 and management-interface port 218.3, where the port type of N or NL is determined by negotiation. N type ports may act as a Fibre Channel point to point port, NL type ports may negotiate as a loop.

Switch-interface ports 218.1 and 218.2 are internal Fibre Channel (FC) interfaces through which the router portion conducts I/O operations with the switch portion. When a mapping to a FC storage device is created, the router-switch software automatically selects one of the switch-interface ports to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, switch-interface ports 218.1 and 218.2 are hidden from the user. One exception is the WWPN of each internal port. The internal WWPNs are called "initiator" WWPNs. Users who set up access control by WWPN on their FC devices set up the device to allow access to both initiator WWPNs.

Switch-interface port 218.3 is used to exchange configuration data and get operational information from switch portion 220 through its management-interface port 224. In the exemplary embodiment, switch-interface port 218.3 is an 10/100 Ethernet port. In the exemplary embodiment, this exchange occurs under the control of a Switch Management Language (SML) Application Program Interface (API) that is part of interface software 216. One example of a suitable API is available from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223.1-223.8, a management interface port 224, and a switch processor module 225.

FC interface ports 221.1 221.2 are coupled respectively to ports of 218.1 and 218.2 of the router-to-switch interface via internal optical fiber links, thereby forming internal FC links. In the exemplary embodiment, each FC interface supports auto-negotiation as either an F or FL port.

FC switch 222, in the exemplary embodiment, incorporates a SANbox2-16 FC switch from QLogic Corporation. This SANbox2 switch includes QLogic's Itasca switch ASIC (application-specific integrated circuit.) Among other things, this switch supports Extended Link Service (ELS) frames that contain manufacturer information.

FC ports 223.1-223.8, which adhere to one or more FC standards or other desirable communications protocols, can be connected as point-to-point links, in a loop or to a switch. For flow control, the exemplary embodiment implements a Fibre Channel standard that uses a look-ahead, sliding-window scheme, which provides a guaranteed delivery capability. In this scheme, the ports output data in frames that are limited to 2148 bytes in length, with each frame having a header and a checksum. A set of related frames for one operation is called a sequence.

Moreover, the FC ports are auto-discovering and self-configuring and provide 2-Gbps full-duplex, auto-detection for compatibility with 1-Gbps devices. For each external FC port, the exemplary embodiment also supports: Arbitrated Loop (AL) Fairness; Interface enable/disable; Linkspeed settable to 1 Gbps, 2 Gbps, or Auto; Multi-Frame Sequence bundling; Private (Translated) Loop mode.

Switch processor module 225 operates the FC switch and includes a switch processor (or controller) 225.1, and associated memory that includes a switch management agent 225.2, and a switch MIB handler 225.3. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Further details on the operation of the above describe system, including high availability embodiments can be found in application Ser. No. 10/128,656, entitled "SCSI-BASED STORAGE AREA NETWORK", application Ser. No. 10/131,793, entitled "VIRTUAL SCSI BUS FOR SCSI-BASED STORAGE AREA NETWORK", and provisional application Ser. No. 60/374,921, entitled "INTERNET PROTOCOL CONNECTED STORAGE AREA NETWORK", all of which have been previously incorporated by reference.

SAN Interconnection Method

Figure 3:
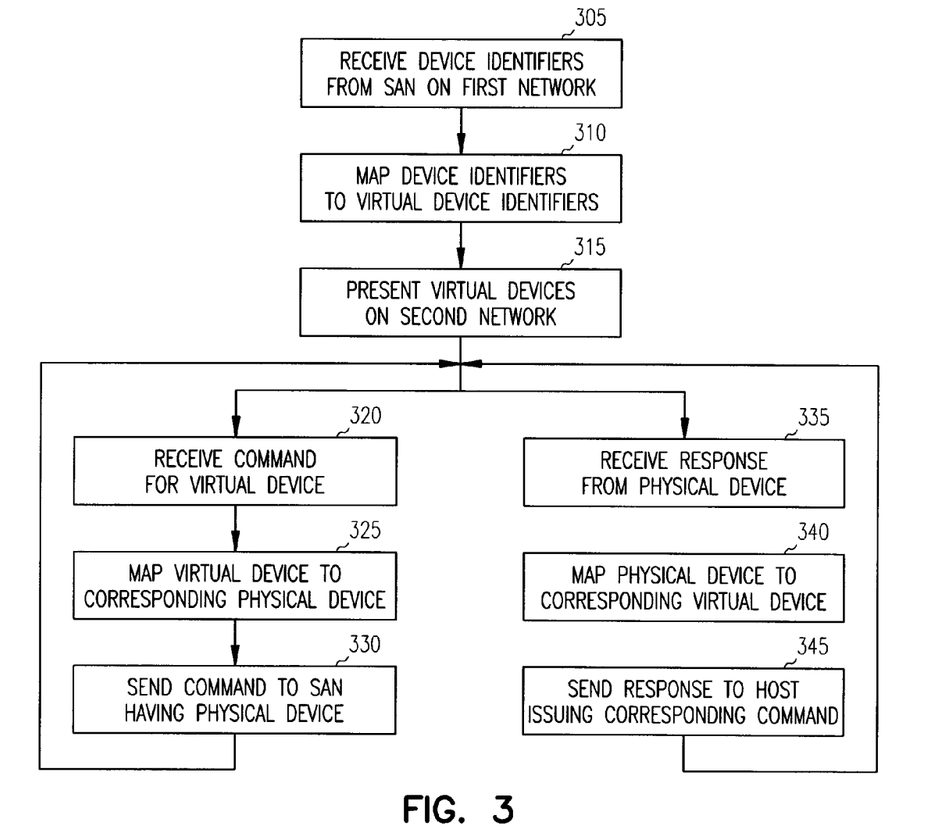
FIG. 3 is a flowchart illustrating a method of interconnecting a SAN to a host according to an embodiment of the invention.

FIG. 3 is a flowchart illustrating a method according to embodiments of the invention for interconnecting a SAN with hosts on a remote network. The method to be performed by the operating environment constitutes computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The method illustrated in FIG. 3 is inclusive of acts that may be taken by an operating environment executing an exemplary embodiment of the invention.

The method begins when a system such as ISI router 111 receives a set of device identifiers representing physical storage devices on a SAN (block 305). In some embodiments, the device identifiers comprise a set of SCSI World Wide Port Names (WWPNs). In some embodiments, these device identifiers will be received in response to a discovery request issued to a storage router connected to the SAN. In some embodiments, the system must login to the storage router using ISCSI login procedures prior to issuing the request. In some embodiments, the login process and device discovery takes place as described in U.S. patent application Ser. No. 09/862,648 entitled "Determining a Remote Device Name" which is hereby incorporated by reference.

Next, the system maps the WWPNs for the physical devices to a corresponding set of WWPNs for virtual devices (block 310). Typically the NAA (Network Address Authority) value of the WWPN for the physical device will be 2, indicating a globally unique WWPN. In some embodiments, the mapping step comprises creating a WWPN for the virtual device by changing the NAA to a value of 3, indicating that the WWPN is a locally assigned address. In alternative embodiments of the invention, a WWPN for the virtual device may be constructed using the MAC address of the ISI router system and an NAA value of 3.

In some embodiments, a World Wide Node Name (WWNN) for the virtual devices is formed comprising the MAC address of the ISI router with a NAA value of 1.

Next, the system presents a set of virtual devices with their corresponding WWPNs on a second network, i.e. a remote network from the SAN (block 315). The virtual devices appear to hosts on the second network as if they were physically present on the second network. The ISI router system responds to commands issued by hosts on the second network for the virtual devices on behalf of the physical devices. Upon receiving such a command (block 320), the system determines the physical device corresponding to the virtual device (block 325) and sends the command to the physical device (block 330). The system maintains data associating the command with the host that issued the command so that it may send any responses to the command to the correct host.

Upon receiving a response from a physical device (block 335), the system determines the corresponding virtual device (block 340), and then determines which host issued the command to that virtual device. The response is then sent to the host (block 345).

This section has described the various software methods in a system that interconnects a SAN with hosts on a remote network. As those of skill in the art will appreciate, the software can be written in any of a number of programming languages known in the art, including but not limited to C/C++, Visual Basic, Smalltalk, Pascal, Ada and similar programming languages. The invention is not limited to any particular programming language for implementation.

CONCLUSION

Systems and methods for interconnecting a SAN with hosts on a remote network are described. The systems and methods form a bridge from hosts on a remote network to storage devices on a SAN. Although specific embodiments have been illustrated and described herein, it will be appreciated by those of ordinary skill in the art that any arrangement that is calculated to achieve the same purpose may be substituted for the specific embodiments shown. For example, the present invention has been described in the context of a storage router network device. The systems and methods of the invention apply equally as well to other types of network devices having a plurality of internal and external network interfaces. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for providing access to a storage area network, the method comprising:

interconnecting a first storage area network and a second storage area network through an iSCSI (internet Small Computer System Interface) SAN (Storage Area Network) interconnect router;

receiving a first set of device identifiers for a first set of physical storage devices on a first storage area network;

receiving a second set of device identifiers for a second set of physical storage devices on a second storage area network;

mapping the first set of identifiers and the second set of identifiers to a set of virtual device identifiers, the mapping including incorporating a MAC (Media Access and Control) address of the iSCSI SAN interconnect router as a portion of the virtual device identifiers; and presenting a set of virtual storage devices identified by the set of virtual device identifiers to a host on a second network.

2. The method of claim 1, further comprising:

receiving a command from the host for at least one virtual device of the set of virtual storage devices;

mapping the at least one virtual device to a corresponding physical device of the first set of physical storage devices or the second set of physical storage devices; and sending the command to the corresponding physical device.

3. The method of claim 2, wherein sending the command includes sending the command over a third network.

4. The method of claim 3, wherein the third network is an IP based network.

5. The method of claim 4, wherein the command is sent using a version of the iSCSI protocol.

6. The method of claim 1, further comprising discovering the first set of device identifiers for the first set of physical storage devices and the second set of device identifiers for the second set of physical storage devices.

7. The method of claim 1, further comprising interconnecting the first storage area network and the second storage area network through a first iSCSI router and a second iSCSI router communicably coupled on a third network to an iSCSI SAN interconnect router.

8. A computer-readable medium having computer executable instructions for performing a method for providing access to a storage area network, the method comprising:
   interconnecting a first storage area network and a second storage area network through an iSCSI (internet Small Computer System Interface) SAN (Storage Area Network) interconnect router;
   receiving a first set of device identifiers for a first set of physical storage devices on a first storage area network;
   receiving a second set of device identifiers for a second set of physical storage devices on a second storage area network; mapping the first set of identifiers and the second set of identifiers to a set of virtual device identifiers, the mapping including incorporating a MAC (Media Access and Control) address of the iSCSI SAN interconnect router as a portion of the virtual device identifiers; and
   presenting a set of virtual storage devices identified by the set of virtual device identifiers to a host on a second network.

9. The computer-readable medium of claim 8, wherein the method further comprises:
   receiving a command from the host for at least one virtual device of the set of virtual storage devices;
   mapping the at least one virtual device to a corresponding physical device of the first set of physical storage devices or the second set of physical storage devices; and
   sending the command to the corresponding physical device.

10. The computer-readable medium of claim 9, wherein sending the command includes sending the command over a third network.

11. The computer-readable medium of claim 10, wherein the third network is an IP based network.

12. The computer-readable medium of claim 11, wherein the command is sent using a version of the iSCSI protocol.

13. A system for providing access to a storage area network, the system comprising:
   an iSCSI interface; and
   a fibre channel server communicably coupled to the iSCSI interface and operable to:
     receive through the iSCSI interface a first set of device identifiers for a first set of physical storage devices on a first storage area network;
     receive through the iSCSI interface a second set of device identifiers for a second set of physical storage devices on a second storage area network;
     map the first set of identifiers and the second set of identifiers to a set of virtual device identifiers, wherein the virtual device identifiers include a MAC (Media Access and Control) address of the system as a portion of the virtual device identifiers; and
     present a set of virtual storage devices identified by the set of virtual device identifiers to a host on a second network communicably coupled to the fibre channel server.

14. The system of claim 13, wherein the fibre channel server is further operable to:
   receive a command from the host for at least one virtual device of the set of virtual storage devices;
   map the at least one virtual device to a corresponding physical device of the first set of physical storage devices or the second set of physical storage devices; and
   send the command to the corresponding physical device.

15. The system of claim 14, wherein the command is sent over a third network.

16. The system of claim 15, wherein the third network is an IP based network.

17. The system of claim 16, wherein the command is sent using a version of the iSCSI protocol.

18. A system for providing access to a storage area network, the system comprising:
   means for interconnecting a first storage area network and a second storage area network through an iSCSI (internet Small Computer System Interface) SAN (Storage Area Network) interconnect router;
   means for receiving a first set of device identifiers for a first set of physical storage devices on a first storage area network and for receiving a second set of device identifiers for a second set of physical storage devices on a second storage area network;
   means for mapping the first set of identifiers and the second set of identifiers to a set of virtual device identifiers, wherein the means for mapping incorporate a MAC (Media Access and Control) address of the iSCSI SAN interconnect router as a portion of the virtual device identifiers; and
   means for presenting a set of virtual storage devices identified by the set of virtual device identifiers to a host on a second network.

19. The system of claim 18, further comprising:
   means for receiving a command from the host for at least one virtual device of the set of virtual storage devices;
   means for mapping the at least one virtual device to a corresponding physical device of the first set of physical storage devices or the second set of physical storage devices; and
   means for sending the command to the corresponding physical device.

* * * * *

UNITED STATES PATENT AND TRADEMARK OFFICE
CERTIFICATE OF CORRECTION

PATENT NO. : 7,433,952 B1
APPLICATION NO. : 10/404377
DATED : October 7, 2008
INVENTOR(S) : Woodruff It is certified that error appears in the above-identified patent and that said Letters Patent is hereby corrected as shown below:

Title Page; item (56);
On Page 3, under "Other Publications", in column 2, line 5, delete "obrtained" and insert -- obtained --, therefor.

In column 2, line 27, after "invention" delete ";" and insert -- . --, therefor.

Signed and Sealed this

Sixth Day of January, 2009

JON W. DUDAS
*Director of the United States Patent and Trademark Office*